Figure 1:
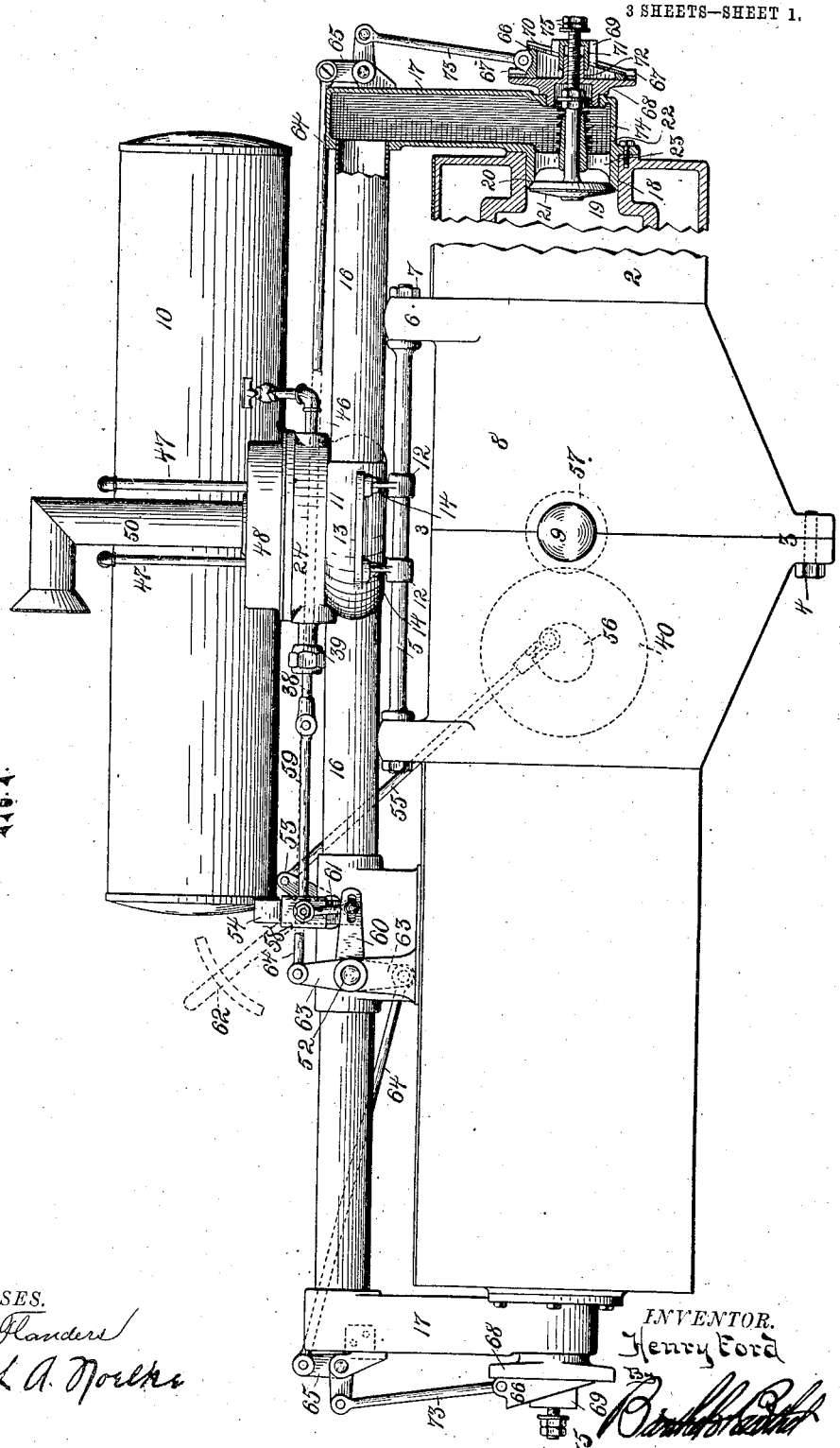

No. 848,891. PATENTED APR. 2, 1907.
H. FORD.
SPEED CONTROLLER AND REGULATOR FOR EXPLOSIVE ENGINES.
APPLICATION FILED AUG. 23, 1902.

3 SHEETS—SHEET 1.

WITNESSES.
Lewis E. Flanders
Joseph A. Noelke

INVENTOR.
Henry Ford
By
Attorneys.

No. 848,891. PATENTED APR. 2, 1907.
H. FORD.
SPEED CONTROLLER AND REGULATOR FOR EXPLOSIVE ENGINES.
APPLICATION FILED AUG. 23, 1902.
3 SHEETS—SHEET 2.
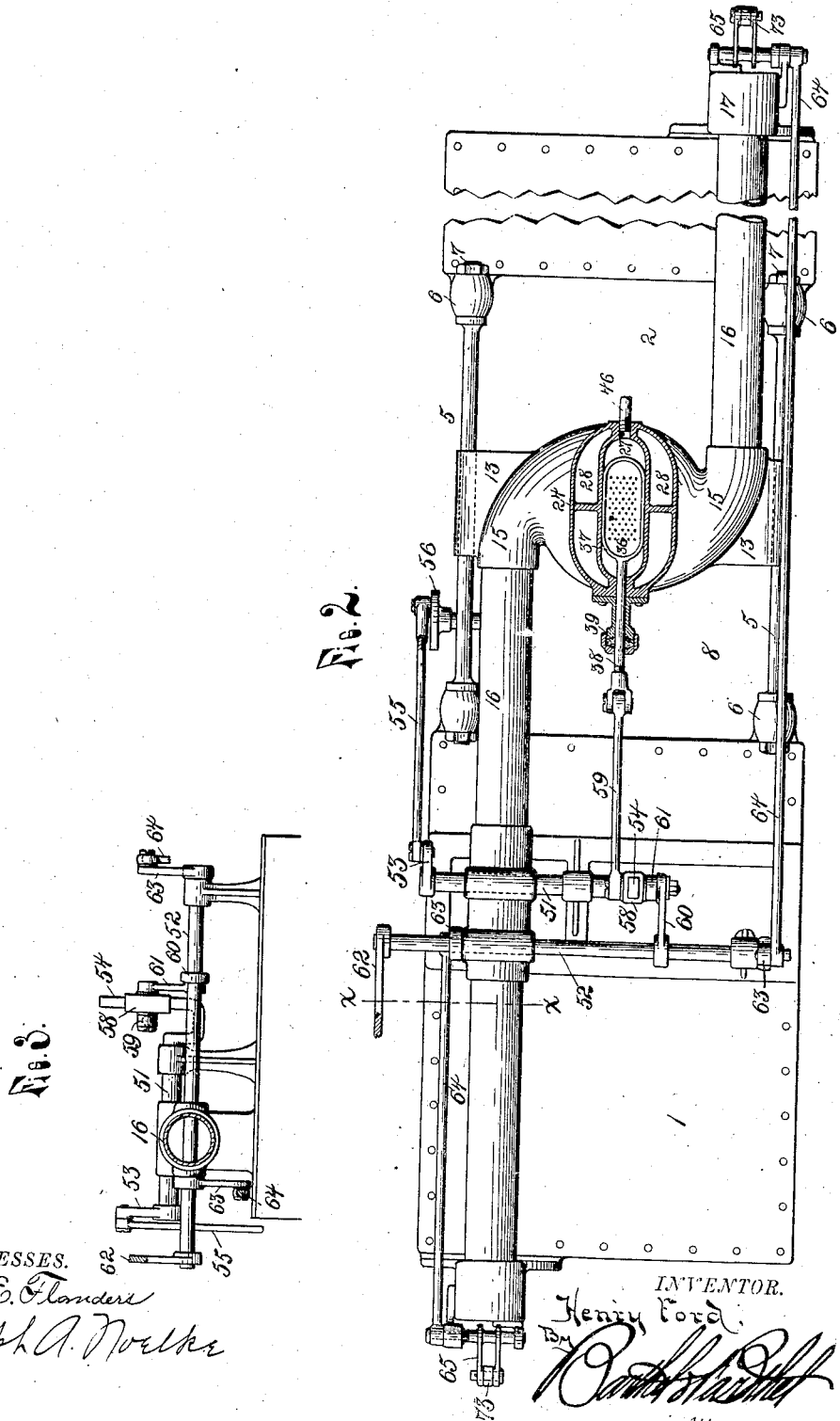
WITNESSES.
INVENTOR.
Henry Ford
Attorneys.

No. 848,891.    PATENTED APR. 2, 1907.
H. FORD.
SPEED CONTROLLER AND REGULATOR FOR EXPLOSIVE ENGINES.
APPLICATION FILED AUG. 23, 1902.
3 SHEETS—SHEET 3.
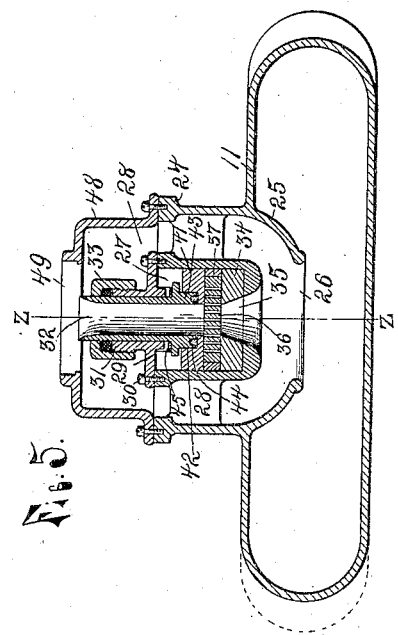
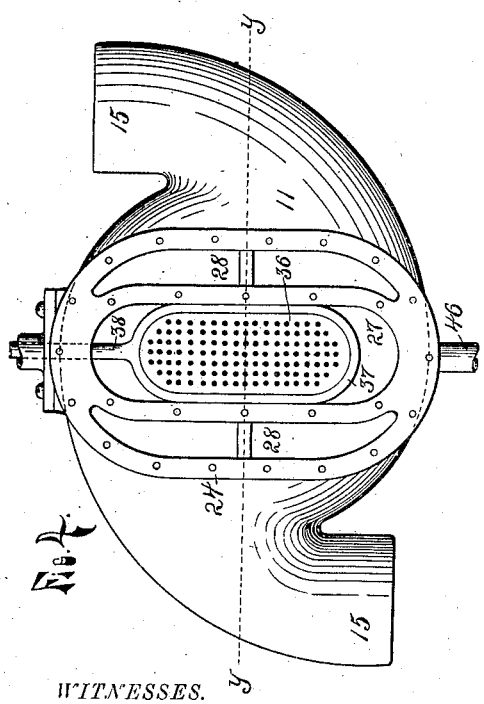
WITNESSES.
Lewis E. Flanders
Joseph A. Noelker
INVENTOR.
Henry Ford
By
Attorneys.

UNITED STATES PATENT OFFICE.

HENRY FORD, OF DETROIT, MICHIGAN, ASSIGNOR TO HENRY FORD COMPANY, OF DETROIT, MICHIGAN, A CORPORATION OF MICHIGAN.

SPEED CONTROLLER AND REGULATOR FOR EXPLOSIVE-ENGINES.

No. 848,891.     Specification of Letters Patent.     Patented April 2, 1907.

Application filed August 23, 1902. Serial No. 120,854.

*To all whom it may concern:*

Be it known that I, HENRY FORD, a citizen of the United States of America, residing at Detroit, in the county of Wayne and State of Michigan, have invented certain new and useful Improvements in Speed Controllers and Regulators for Explosive-Engines, of which the following is a specification, reference being had therein to the accompanying drawings.

My invention refers to explosive-engines in which an explosive mixture of light hydrocarbon oil and air is drawn into the cylinder by suction, and has for its object to control the speed of the engine within its working limits by controlling the quantity of the explosive mixture allowed to be drawn into the cylinder.

To this end my invention refers to means for conducting a measured quantity of hydrocarbon and a measured quantity of air through the intake-pipe into the cylinder, in combination with means under control of the operator for proportionately increasing or decreasing the quantity of air and oil, so as to change at will the quantity of the explosive mixture without changing its quality, all as more fully hereinafter set forth.

The invention consists, further, in the peculiar construction, arrangement, and combination of parts, all as more fully hereinafter described and claimed in the specification and shown in the accompanying drawings, in which—

Figure 1 is a side elevation of a gasolene-engine, showing my invention, parts being broken away to better illustrate the parts. Fig. 2 is a plan view thereof, the gasolene-feed mechanism and air-inlet being shown in section. Fig. 3 is a section on line *x x*, Fig. 2, through the valve mechanism looking to the right. Fig. 4 is a plan view of the gasolene-chamber, air-inlet, and mixer, with the top casing removed. Fig. 5 is a vertical central section on line *y y*, Fig. 4; and Fig. 6 is a section on line *z z*, Fig. 5, at right angles to said figure.

In all of the drawings like numerals refer to like parts, and, as shown in the drawings, 1 2 are the two cylinder-castings bolted together on the line 3 3 by the tap-bolts 4 at the bottom and the shouldered rods 5 at the top, fitting in suitable apertured ears 6, integrally formed in the castings and set up on their opposite ends by the nuts 7.

8 is the crank-casing; 9, the crank-shaft journaled in bearings in the opposite sides of the casing; and 10 is the gasolene-supply tank.

11 is a circular casing forming the mixing-chamber, supported upon the rods 5 by the brackets 12, sleeved thereon and secured at their upper ends to the lips 13 on the casing by the bolts 14.

15 are tangential outlet-openings formed in the opposite sides of the casing and connected with the inlet-ports of their respective cylinders by the intake-pipes 16, the vertical member 17 of said pipes being preferably cast and formed with a right-angled portion 18, fitting within the inlet-openings 19, and forming a valve-seat 20 for the inlet-valves 21, guided in said openings by the sleeve 22, supported therein by the radial ribs 23.

24 is an upwardly-extending portion of the casing 11, and 25 a downwardly and inwardly flaring portion formed with a circular opening 26, within the mixing-chamber proper. Integrally formed in the upper end of said casing is the gasolene-chamber 27, with the air-inlet passages 28 on either side uniting at their lower end below the gasolene-chamber, and 29 is a cover for said gasolene-chamber, held in place by screws 30, a screw-threaded nipple 31 projecting above the center of said plate and through which the auxiliary air-inlet pipe 32 projects, a packing-nut 33 being provided to make a tight joint.

34 is a steel wearing-plate let into the bottom of the gasolene-chamber, and 35 is an outwardly-flaring aperture formed in said plate and in the bottom of the gasolene-chamber in line with the auxiliary air-inlet pipe. 36 is a perforated plate lying on top of the wearing-plate 34 and over the aperture 35, adapted to be reciprocated and guided within said chamber by a looped frame 37, encircling said plate and provided with a stem 38, projecting out through a stuffing-box 39 on the side of the casing, whereby said plate is detachably held in position, and one having different sized or a greater or lesser number of perforations may be readily substituted as desired.

41 is an apertured block or plate on top of the plate 36, formed with a counterbore 42, into which the flanged nipple 43 of the auxiliary inlet-pipe fits, a gasket 44 being interposed between the end of said nipple and the shoulder of the counterbore to form a tight joint, and 45 is a flat spring, acting against the flanged portion of said pipe to yieldingly hold the block 41 against the plate 36 to form a tight joint, the adjacent faces of the wear-plates 34 and 41 and the opposite faces of the plate 36 being ground absolutely true to form a perfect working joint between them as the plate 36 reciprocates.

46 is a gasolene-supply pipe connecting the gasolene-tank with the gasolene-chamber, and 47 are air-pipes connecting the gasolene-chamber with the gasolene-tank, so that as the gasolene is drawn from the tank it will be replaced by air from the gasolene-chamber.

48 is a suitable cover for the casing 11, provided with a central aperture 49 in line with and of somewhat larger diameter than the auxiliary air-inlet pipe 32, and 50 is the air-intake pipe, loosely fitting in said aperture and provided with an elbow and flaring mouthpiece facing toward the front of the machine, so that the air will have ready access thereto, a suitable screen being provided in said pipe to prevent the ingress of dirt or dust.

51 and 52 are transverse rock-shafts mounted in suitable bearings on top of the cylinder-casting, and 53 and 54 are rock-arms carried by the opposite ends of the shaft 51, the arm 54 being preferably formed integral therewith and with a U-shaped bend, as shown in Fig. 3.

55 is a link connecting the rock-arm 53 with a crank-disk 56, journaled in the crank-casing and carrying a gear-wheel 40, meshing with a gear-pinion 57 on the crank-shaft, from which motion is derived for operating the valve and feeder mechanism.

58 is a sleeve having a sliding engagement with the squared portion of the rock-arm 54 and provided with wrist-pins on its opposite sides.

59 is a link connecting the stem of the feeder mechanism with one of said pins, and 60 is rock-arm fast on the shaft 52 and pivotally connected at its outer end, by means of a link 61, with the other of said pins, said link having a limited adjustment on the outer end of said arm, as shown.

62 is a hand or controlling lever fast upon one end of the shaft 52 within convenient reach of the operator and forms the only means for moving said shaft. 63 are rock-arms mounted at or near the opposite ends of said shaft, and 64 are links connecting the free ends of said arms with bell-crank levers 65, pivotally mounted in bearings on the upper ends of the tubes 17.

66 is a slotted wedge slidingly mounted in suitable guides 67, formed on the apertured bearing-block 68, through which the stem of the inlet-valve passes, the wedge 66 being free to have a limited vertical movement. 69 is a similar wedge-block, free to move only in line with the valve-stem, but coöperating with the wedge 66 to form a variable stop or abutment for the opening movement of the inlet-valve as the wedge 66 is moved in or out. The block 69 travels in suitable guides 70 on the adjacent face of the wedge 66 to form a square shoulder for the stop or shoulder 75 on the valve-stem.

71 is a sleeve formed on the under side of the block 69, fitting over a nipple 72 on the block 68, through which the valve-stem passes, all within the slot or wedge 66, which slot preferably forms a stop to limit the movement of said wedge.

73 is a link pivotally connecting the wedge 66 with the free end of the bell-crank lever 65.

74 is a coil-spring sleeved on the stem of the inlet-valve and acting through the medium of nuts, forming a shoulder to hold the same normally closed, and 75 are adjusting-nuts on the end of said stem, coöperating with the variable stop to limit the opening movement of the inlet-valves, a greater opening movement being obtained by means of the wedge-blocks just described and intermediate mechanism at the will of the operator, the quantity of explosive mixture drawn in being in proportion to said opening movement.

The valve mechanism for both cylinders being alike, I have deemed it necessary only to describe one, and I may, if desired, move both wedge-blocks 66 and 69 by a mere duplication of the mechanism already described.

Having thus fully described the invention, it is intended to operate as follows: The chamber 27 being filled with gasolene from the supply-tank and the engine turned over to its initial or suction stroke, air will be drawn in through the air-inlet passages 28, and as a portion of the air is drawn in through the pipe 32 it will draw in a sufficient quantity of gasolene in passing through the perforated plate 36, the perforations or pockets of which are constantly filled with gasolene from the chamber 27, the amount of gasolene admitted at each charge varying according to the length of stroke of the plate or the number of perforations or pockets permitted to pass the opening 35, all under control of the operator through the medium of a suitable hand or foot lever 62 and intermediate mechanism, so that as the sleeve 58 is moved up on the arm 54 on the end of shaft 51 the length of stroke will be increased, and consequently more gasolene admitted, requiring a greater opening of the inlet-valves, which is accomplished by means of the rock-shaft 52, links 64, bell-crank levers 65, links 73, and wedges 66, which as the hand-lever 62 is moved forward withdraws these wedges to the desired extent through the medium of the mechanism just described and permits a greater opening movement of the inlet- valves, so that it will be seen that by means of a single common lever the movement of both the inlet-valves on a two-cylinder engine and the amount of gasolene supplied are controlled at one and the same time and a perfect mixture and working of the engine obtained under all conditions of use.

The parts are preferably so set and intended to operate that the inlet-valves instead of being mere suction-valves will also act as throttle-valves and will always have a limited opening movement just sufficient to keep the engine running, from which the speed of the engine may be increased by the controlling-lever to the maximum limit.

Having thus fully described my invention, what I claim as new, and desire to secure by Letters Patent, is—

1. In an explosive-engine, the combination with an air-intake pipe into the cylinder open to the atmosphere and having an automatically-operating suction-valve at the junction of the intake-pipe with the cylinder, of a variable oil-feeding device in the intake-pipe comprising a multiported slide-valve operated by the engine and adapted to feed the oil in measured quantity into the intake-pipe, means under control of the operator for varying the quantity of oil discharged at each suction-stroke of the piston, and connection between said controlling means and the suction-valve whereby the extent of opening of the suction-valve and correspondingly the amount of air permitted to pass through the suction-valve into the cylinder is proportionately varied.

2. In an explosive-engine, the combination with an air-intake pipe into the cylinder open to the atmosphere and an automatically-operating suction-valve at the junction of the intake-pipe with the cylinder, a variable abutment for said valve controlling the extent of opening of said valve, a vertical branch in the intake-pipe, a gasolene-holder through which said branch pipe passes, a multiported slide-valve in said gasolene-holder traversing the branch pipe and adapted to vary the oil-feed by varying the stroke of the valve, a lever under the control of the operator for lengthening or shortening the stroke of the valve, and connection between said lever and the variable abutment of the intake-pipe for correspondingly increasing or decreasing the extent of opening of the suction-valve whereby the quality of the explosive fluid remains fixed but the quantity is variable.

3. In an explosive-engine the combination, of a generator comprising an air-intake pipe open at one end and connected at the other end to the cylinder, an automatic suction-valve at the junction of the intake-pipe with the cylinder, an adjustable stop at the end of the valve-stem limiting the motion of the valve, a variable abutment consisting of two wedge-shaped members one of which is under the control of the operator, a gasolene-holder, a supply-tank communicating with said gasolene-holder, a vertical branch in the air-intake pipe passing through said gasolene-holder, a slide-valve submerged in the gasolene-holder and variably traversing the branch pipe and variable valve-gear for said valve under control of the operator.

4. In an explosive-engine, the combination with an air-intake pipe open to the atmosphere having an automatically-operating suction-valve at the junction of said intake-pipe with the working cylinder, a vertical branch in said intake-pipe through which a portion of the air passes, a gasolene-holder through which said branch pipe passes, a multiported slide-valve submerged in said gasolene-holder and traversing said branch pipe, a rock-arm operated by the motion of the engine and carrying a sliding sleeve, actuating valve-gear connected to said sliding sleeve, a lever under the control of the operator, connections between said sliding sleeve and the lever for lengthening and shortening the stroke of the valve, a variable abutment controlling the extent of opening of the automatic valve and means connecting said abutment with the sliding sleeve, whereby the lengthening or shortening of the stroke of the valve correspondingly increases or restricts the extent of opening of the suction-valve.

5. In an explosive-engine the combination with the cylinder, of a generator forming the intake-pipe, a casing in said pipe provided with a horizontal diaphragm forming a mixing-chamber in the lower portion of the casing and a gasolene-holder in the upper portion of the casing, the intake-passage leading through said holder and the multiported slide-valve in said holder traversing said passage at substantially right angles thereto and intermittently communicating with said holder on opposite sides and the apertured seats on opposite sides of said valve in line with said passage.

6. In an explosive-engine the combination with the cylinder, of a generator comprising an air-intake pipe open at one end and connected at the other end to the cylinder, a casing in said pipe provided with the two side passages and the central passage through it, the horizontal diaphragm forming a mixing-chamber in the lower portion of the casing and the gasolene-holder above it, through which the central passage passes, the variably-actuated slide-valve in said holder intermittently communicating with said holder and said passage and the seats on opposite sides of the slide-valve.

7. In an explosive-engine the combination with the cylinder, of a generator comprising an air-intake pipe open at one end and connected at the other end to the cylinder, a casing forming a portion of said pipe, provided with a gasolene-holder and the passages around said holder uniting above and below said holder and the central passage through it, a diaphragm forming a mixing-chamber in the lower portion of the casing and a multi-ported slide-valve in said holder having a variable movement in open communication with the central passage.

8. In an explosive-engine the combination with the cylinder, of a generator comprising an air-intake pipe open at one end and connected to the cylinder at the other end, a casing in said pipe, a gasolene-holder in said casing, air-passages around said holder and a central passage through it uniting above and below said holder, a diaphragm forming a mixing-chamber in the casing below said holder, a slide-valve in said holder traversing said central passage, an automatically-operating suction-valve at the junction of said intake-pipe with the cylinder and means under control of the operator for proportionately varying the stroke of the slide-valve and the opening movement of the suction-valve in direct proportion to each other.

In testimony whereof I affix my signature in presence of two witnesses.

HENRY FORD.

Witnesses:
WILLIAM H. MURPHY,
WILLIAM H. WETHERBEE.